US009251462B2

(12) United States Patent
Huang et al.

(10) Patent No.: US 9,251,462 B2
(45) Date of Patent: *Feb. 2, 2016

(54) EMOTION SCRIPT GENERATING, EXPERIENCING, AND EMOTION INTERACTION (75) Inventors: Cheng Huang, Shanghai (CN); Dong Huang, Shanghai (CN); Yuan Jin, Shanghai (CN); Fang Rui Shu, Shanghai (CN); Kai Ye, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/302,899

(22) Filed: Nov. 22, 2011

(65) Prior Publication Data
US 2012/0136219 A1 May 31, 2012

(30) Foreign Application Priority Data

Nov. 30, 2010 (CN) .......................... 2010 1 0580301

(51) Int. Cl.
*G06N 5/02* (2006.01)
*G06N 5/00* (2006.01)

(52) U.S. Cl.
CPC .. *G06N 5/02* (2013.01); *G06N 5/00* (2013.01); *G06N 5/003* (2013.01)

(58) Field of Classification Search
CPC ............ G09N 5/00; G06N 5/02; G06N 5/003
USPC ......................................................... 434/236
See application file for complete search history.

(56) References Cited

U.S. PATENT DOCUMENTS

| 7,434,176 | B1* | 10/2008 | Froloff ......................... 715/839 |
| 7,451,079 | B2* | 11/2008 | Oudeyer ....................... 704/205 |
| 2002/0105427 | A1* | 8/2002 | Hamamoto et al. .......... 340/576 |
| 2004/0147814 | A1* | 7/2004 | Zancho et al. ................ 600/300 |
| 2006/0221935 | A1* | 10/2006 | Wong et al. ................... 370/352 |

(Continued)

FOREIGN PATENT DOCUMENTS

| CN | 1514399 A | 7/2004 |
| CN | 1626029 A | 6/2005 |

OTHER PUBLICATIONS

"Elements of an EmotionML 1.0", http://web.archive.org/web/20100617142214/http://www.w3.org/2005/Incubator/emotion/XGR-emotionml-20081120/#s2.2, Wayback Machine date of Jun. 17, 2010.*

(Continued)

Primary Examiner — Michael Grant
(74) Attorney, Agent, or Firm — Steven L. Nichols; Fabian VanCott (57) ABSTRACT An emotion script generating apparatus, comprising means to receive emotion data, in which the emotion data is obtained according to measurable physiological parameters reflective of a user's emotions; and means to generate emotion script using the emotion data based on a predefined template. An emotion script experiencing apparatus, comprising means to receive emotion script, wherein the emotion script is generated using emotion data and is based on a predefined template, the emotion data capable of being obtained according to measurable physiological parameters reflective of a user's emotions; and means to affect a user by using emotion data extracted from the emotion script, so as to cause the user to experience the emotion script.

20 Claims, 8 Drawing Sheets (56) References Cited

U.S. PATENT DOCUMENTS

| | | | | |
|---|---|---|---|---|
| 2006/0279476 | A1* | 12/2006 | Obata | 345/2.3 |
| 2007/0142042 | A1* | 6/2007 | Thoresson | 455/418 |
| 2007/0167689 | A1* | 7/2007 | Ramadas et al. | 600/300 |
| 2008/0059158 | A1* | 3/2008 | Matsuo et al. | 704/221 |
| 2008/0096532 | A1* | 4/2008 | Lyle et al. | 455/412.1 |
| 2009/0002178 | A1* | 1/2009 | Guday et al. | 340/573.1 |
| 2009/0040231 | A1* | 2/2009 | Sano et al. | 345/474 |
| 2009/0063154 | A1* | 3/2009 | Gusikhin et al. | 704/260 |
| 2009/0144366 | A1* | 6/2009 | Lyle | 709/204 |
| 2009/0249441 | A1* | 10/2009 | Garbow et al. | 726/1 |
| 2010/0086204 | A1 | 4/2010 | Lessing | |
| 2010/0105426 | A1* | 4/2010 | Jaiswal et al. | 455/556.1 |
| 2010/0250554 | A1* | 9/2010 | Shu | 707/748 |
| 2011/0124977 | A1* | 5/2011 | Winarski | 600/301 |
| 2011/0201414 | A1* | 8/2011 | Barclay et al. | 463/25 |
| 2011/0294525 | A1* | 12/2011 | Jonsson | 455/466 |
| 2011/0300847 | A1* | 12/2011 | Quy | 455/419 |
| 2011/0300884 | A1* | 12/2011 | Ollila et al. | 455/466 |
| 2012/0190937 | A1* | 7/2012 | Huang et al. | 600/300 |
| 2012/0323087 | A1* | 12/2012 | Leon Villeda et al. | 600/301 |
| 2012/0330660 | A1* | 12/2012 | Jaiswal | 704/235 |

OTHER PUBLICATIONS

Alena Neviarouskaya; Narrowing the Social Gap Among People Involved in Global Dialog: Automatic Emotion Detection in Blog Posts URL: http://www.icwsm.org/papers/4—Neviarouskaya-Prendinger-Ishizuka.pdf; lBoulder, Colorado, USA; Mar. 26, 2007; pp. 1-2.

Alena Neviarouskaya; User Study on Affectim, an Avatar-Based Instant Messaging System Employing Rule-Based Affect Sensing From Text; URL: http://dx.doi.org/10.1016/j.ijhcs.2010.02.003; Oct. 23, 2008; Abstract Only; p. 1.

Wikipedia, The Free Encylopedia, Valence, http://en.wikipedia.org/wiki/Valence_(psychology), pp. 1-2, Sep. 11, 2015.

Plutchik, The Nature of Emotions, www.fractal.org/Bewustzijns-Besturings-Model/Nature-of-emotions.htm, pp. 1-2, Sep. 14, 2015.

* cited by examiner

EMOTION SCRIPT GENERATING, EXPERIENCING, AND EMOTION INTERACTION

CROSS-REFERENCE TO RELATED APPLICATIONS

The present application is a continuation-in-part, and claims the benefit under 35 U.S.C. §119(a), of Chinese Application No. 201010580301.8, filed Nov. 30, 2010. This application is herein incorporated by reference in its entirety.

BACKGROUND

As the Internet technologies develop, people increasingly exchange information through the Internet, such as instant messaging, email, blog, bulletin board system (BBS), and video/voice conversation, among others. While information is exchanged through the Internet, exchanging emotion via the Internet has become increasingly desirable. In current communication through the Internet, a user may use some simple symbols, icons or pictures to express his or her mood to other users. For example, ":-)" may express "joy" and ":(" may express "sadness." Other examples may exist.

SUMMARY

The present specification provides an emotion script generating method and apparatus, an emotion script experiencing method and apparatus, as well as an emotion interaction system.

According to a first aspect of the present specification, there is provided an emotion script generating method, which may comprise receiving emotion data, wherein the emotion data are obtained according to measurable physiological parameters reflective of a user's emotions, and generating emotion script using the emotion data based on a predefined template.

According to a second aspect of the present specification, there is provided an emotion script generating apparatus, which may comprise means to receive emotion data, wherein the emotion data is obtained according to measurable physiological parameters reflective of a user's emotions, and means to generate emotion script using the emotion data based on a predefined template.

According to a third aspect of the present specification, there is provided an emotion script experiencing method comprising receiving emotion script, wherein the emotion script is generated using emotion data and based on a predefined template, the emotion data capable of being obtained according to measurable physiological parameters reflective of a user's emotions; and actuating a user by using emotion data extracted from the emotion script, so as to cause the user to experience the emotion script.

According to a fourth aspect of the present specification, there is provided an emotion script experiencing apparatus comprising means to receive emotion script, wherein the emotion script is generated using emotion data and based on a predefined template, the emotion data capable of being obtained according to measurable physiological parameters reflective of a user's emotions; and actuating means to actuate a user by using emotion data extracted from the emotion script, so as to cause the user to experience the emotion script.

According to a fifth aspect of the present specification, there is provided an emotion interaction system, which may comprise an emotion script generating apparatus according to the second aspect of the present specification, and an emotion script experiencing apparatus according to the fourth aspect of the present specification.

By using the methods, apparatuses, and system of the present specification, emotion script can be generated from emotion data conveniently, rapidly and effectively, and services are provided to users by using the generated emotion script, so that user experience is improved.

Other features and advantages of the present specification will become apparent from the following description of the examples describing principles of the present specification and with reference to the accompanying drawings.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Since human emotions are extremely complex, it is difficult to inclusively express various kinds of human emotions by simply using the above mentioned symbols, icons or pictures. In addition, existing methods can express certain basic emotions but cannot make quantitative adjustments to expressed emotions or express relatively complex emotions. That is, the expressing capability of the existing methods is limited. Further, existing methods fail to bring directly from one user to other users an emotional actuation to experience, thereby limiting the other users' experience of this user's emotions.

In the following, specific examples of the present application will be explained and described in more detail with reference to the accompanying drawings. The descriptions of the various examples of the present specification have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical advantages over technologies found in the marketplace, or to enable others of ordinary skill in the art to understand the examples disclosed herein.

Certain technical terms used in the present application may first be explained. In the present specification and in the appended claims the term "emotion data" is meant to be understood broadly as any data representing any emotion generated by a user. For example, when a user accesses certain content, he or she might generate a corresponding emotion according to the content, such as the user's active emotion. Some examples may include an emotion generated when the user is chatting with a friend, writing an email to his or her distant family or browsing an Internet page.

The emotion data may be obtained according to a number of measurable physiological parameters reflective of the user's emotions. The content may be all or part of a picture, text, video or audio. Emotion data may include unprocessed physiological and action signals such as a heart rate, a breath rate, a blood pressure, electroencephalogram parameters, a body temperature, and cutaneogalvanic reaction among others. These unprocessed physiological and action signals may also be referred to as physiological parameters. Different physiological parameters are associated with different emotion categories such as "like," "dislike," "afraid," and "joy." When a user accesses different content, for example, when he or she views video of dangerous accidents or beautiful scenery images or hears shrilling screams, he or she might generate different emotions so that the user's physiological parameters will have changed accordingly. Emotion data can further include values calculated by a certain feature extracting method by using the physiological parameters, wherein the feature extracting method can for example relate to calculating a difference in heart rates in two consecutive minutes, that is, a first derivative of heart rate.

A user's emotion data can be a vector whose elements can be a number of physiological parameters including a heart rate, a breath rate, blood pressure, electroencephalogram parameters, body temperature, and cutaneogalvanic reaction, among others. A plurality of users' emotion data can constitute a matrix, each row or column of which corresponds to a user's emotion data.

In the present specification and in the appended claims the term "emotion script" is meant to be understood broadly as any expression of emotion-related information of a user. In one example, emotion script may be used for expressing emotion-related information of a user, such as emotion categories, emotion data acquisition manners, and user physiological parameters, among others.

Emotion script can be expressed in an Emotion Markup Language proposed by the World Wide Web Consortium (W3C®) Emotion Markup Language Incubator Group or any other proper language that is defined by those skilled in the art or users by themselves.

Figure 1:
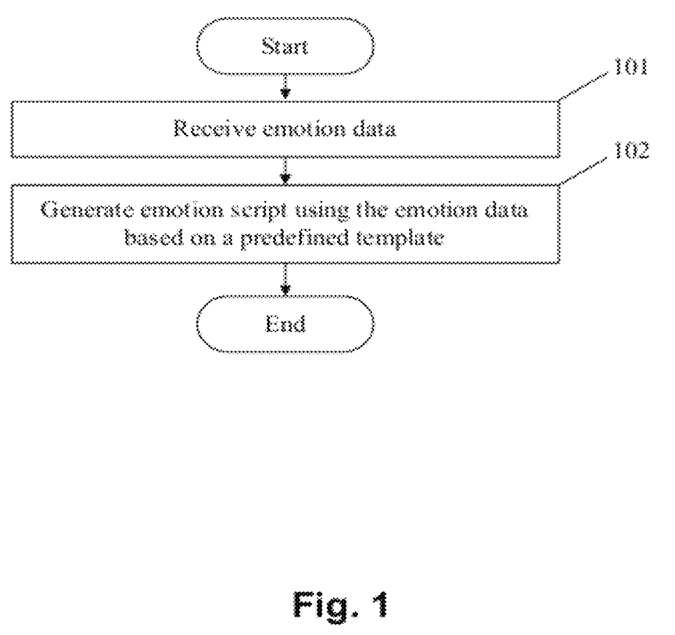
FIG. 1 is a flowchart of an emotion script generating method according to one example of principles described herein.
Figure 2:
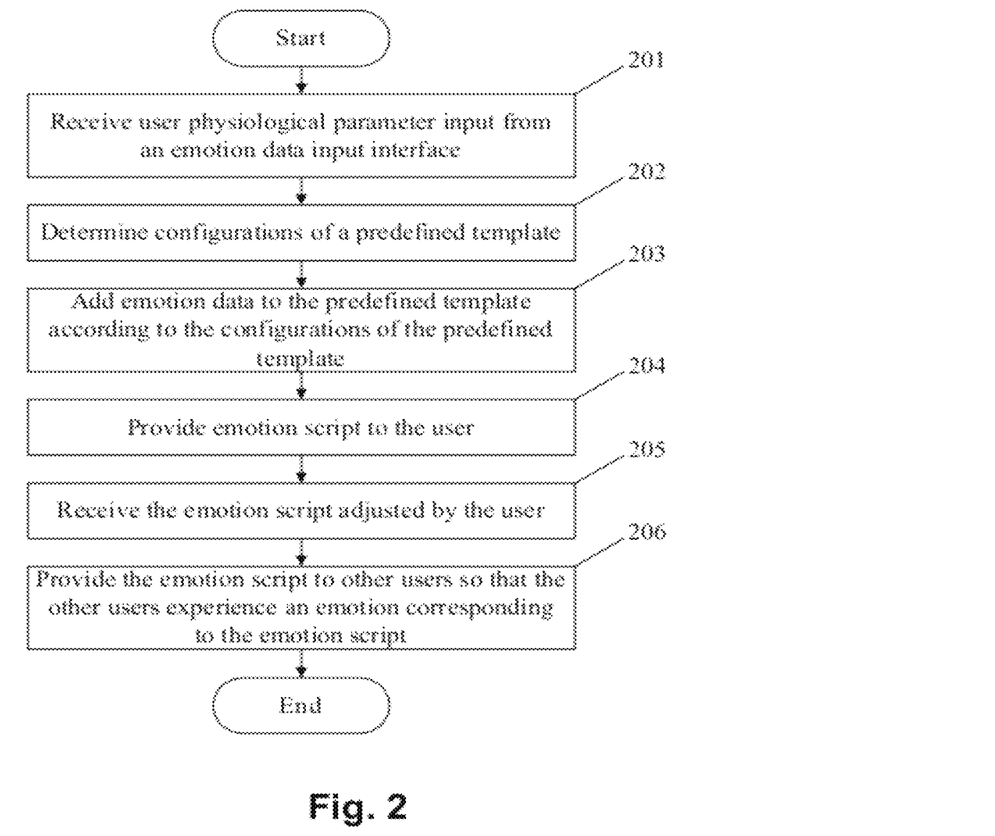
FIG. 2 is a flowchart of an emotion script generating method according to another example of principles described herein.
Figure 4:
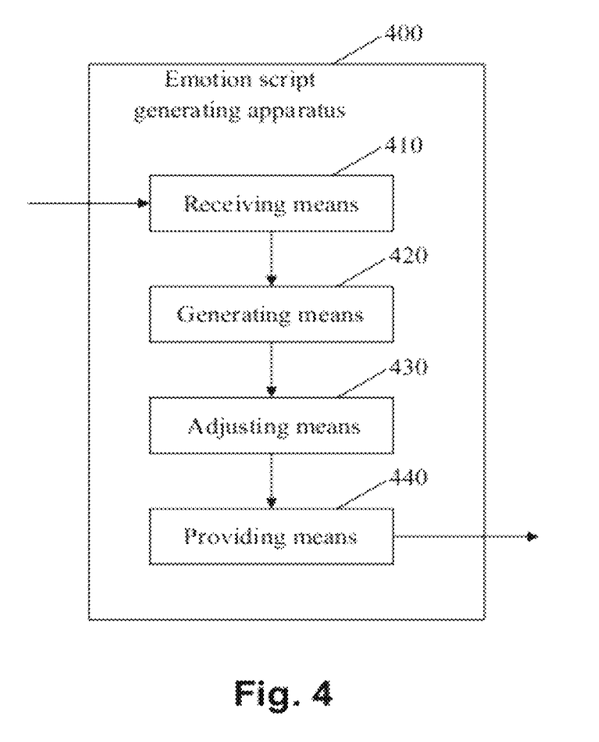
FIG. 4 is a block diagram of an emotion script generating apparatus according to one example of principles described herein.
Figure 5:
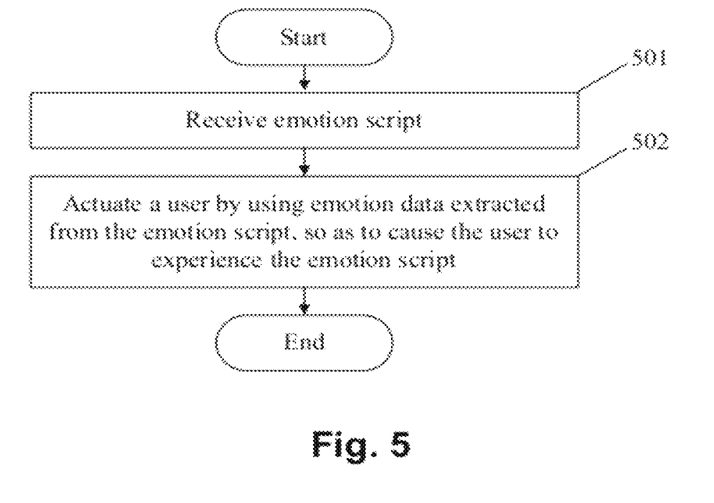
FIG. 5 is a flowchart of an emotion script experiencing method according to one example of principles described herein.
Figure 6:
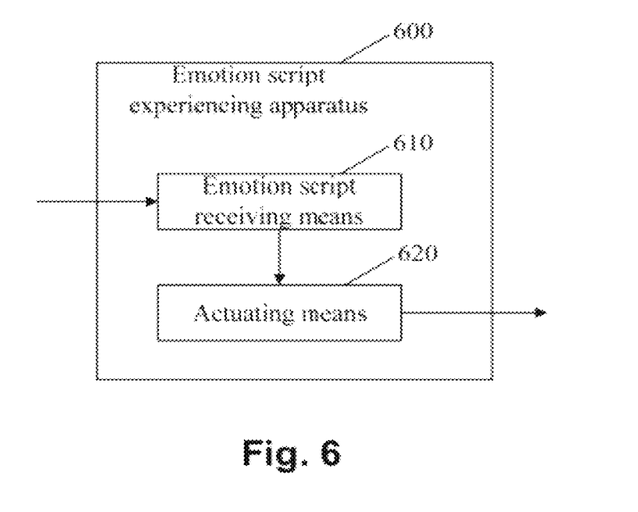
FIG. 6 is a block diagram of an emotion script experiencing apparatus according to one example of principles described herein.
Figure 7:
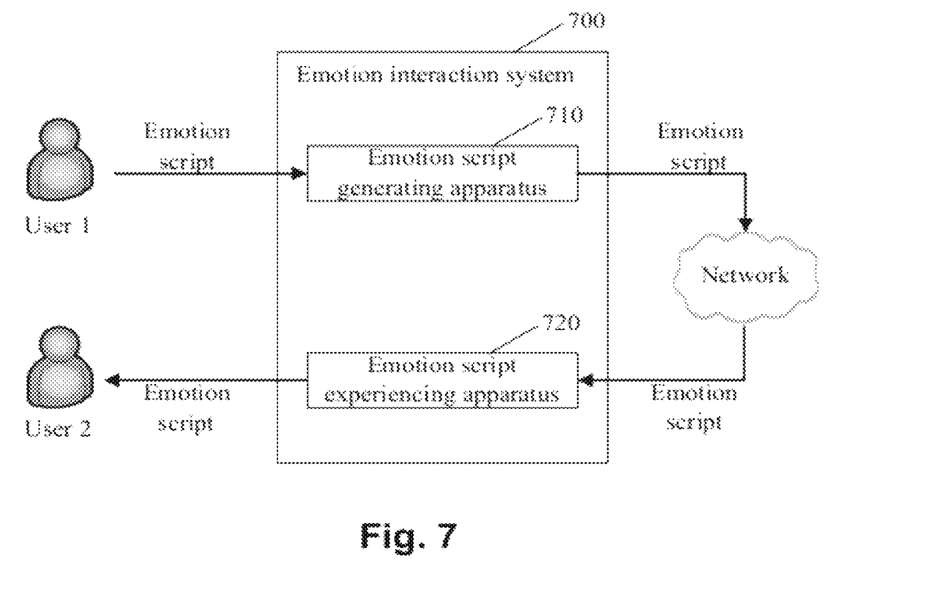
FIG. 7 is a schematic view of an emotion interaction system according to an one example of principles described herein.

The present specification includes an emotion script generating method and apparatus, an emotion script experiencing method and apparatus, as well as an emotion interaction system. FIGS. 1 and 2 illustrate two respective examples of the emotion script generating method according to the present specification. FIG. 4 illustrates an example of the emotion script generating apparatus. FIG. 5 illustrates an example of the emotion script experiencing method. FIG. 6 illustrates an example of the emotion script experiencing apparatus. FIG. 7 illustrates an example of the emotion interaction system that may comprise the emotion script generating apparatus and the emotion script experiencing apparatus according to the present specification.

In an example of the present specification, emotion data can be received first, and emotion script is generated using the emotion data based on a predefined template. In the present specification, emotion data may be obtained according to measurable physiological parameters reflective of a user's emotions. User physiological parameters may include, for example, heart rate, breath rate, blood pressure, electroencephalogram parameters, body temperature, and/or cutaneogalvanic reaction, among others.

Reference emotion data can be used for determining whether the acquired physiological parameters are normal emotion data. For example, whether the physiological parameters are within a normal range may be determined by calculating a difference between a user's reference emotion data and the acquired user's physiological parameters. This may be done so as to determine whether the physiological parameters can serve as emotion data for generating emotion script.

When a range of values corresponding to each emotion is predetermined in advance, the emotions corresponding to the emotion data can be determined by using the reference emotion data. For example, when a difference between the emotion data and the reference emotion data falls within a predetermined range of values of the emotion "joy", the emotion corresponding to the emotion data is "joy." Similarly, when a difference between the emotion data and the reference emotion data falls within a predetermined range of values of the emotion "afraid", the emotion corresponding to the emotion data is "afraid". Therefore, a user's reference emotion data may be used to determine what emotion the user is feeling when generating emotion data.

In another example, the user's reference emotion data may be received and the reference emotion data may be determined based upon physiological parameters of a number of users in, for example, a calm state. The reference emotion data can be emotion data generated by the user with respect to designated content upon registration, an average of emotion data generated when the user accesses a series of ordinary content in different periods of time, or results obtained by using other more complicated methods.

Then it may be determined if the user's emotion data currently received are within a normal range. This may be determined based upon the user's reference emotion data. If the user's received emotion data is within a normal range, the emotion data may be used for generating emotion script. If the user's received emotion data is not within a normal range, the emotion data will not be used for generating emotion script. For example, a difference between the currently acquired user's emotion data and the user's reference emotion data may be calculated and a determination may be made as whether the average is within a normal range. Alternatively, a percentage of the difference relative to the reference value may be calculated, an average can be calculated from the percentage. It may then be determined if the average is within a normal range. The normal range can be determined according to medical criteria, for example, the normal range of a user's heart rate may fall between zero and a predetermined maximum as defined by medical science. Additionally, the normal range of a user's heart rate may be within a numerical range not consisting of a negative value or too high of a value.

In addition, in one example, when a range of values corresponding to each emotion is preset, it can also be determined what emotion a user generating the currently received emotion data is presently feeling. This determination may be based upon reference emotion data.

FIG. 1 is a flow chart showing an emotion script generating method according to one example of principles described herein. According to the method, emotion data may be received (block 101) and the emotion script may be generated (block 102) using the emotion data. The generation (block 102) of the emotion script may be based on a predefined template. The emotion data received (block 101) may be obtained according to measurable physiological parameters reflective of a user's emotions. Additionally, as described above, the emotion data may be received using various methods.

In one example, the emotion data is received (block 101) by obtaining user physiological parameters acquired by a physiological parameter sensor or a biological signal detector. In one example, before the emotion data is received (block 101), physiological parameters generated by a user may be sensed at a user terminal. The user terminal may then obtain emotion data according to the sensed physiological parameters and provide the obtained emotion data to the emotion script generating apparatus, so that the emotion script generating apparatus can receive (block 101) the emotion data.

In the example where the user physiological parameters are received (block 101) by a physiological parameter sensor or a biological signal detector, the physiological parameter sensor or the biological signal detector may be arranged near or at a client's location. For example, the physiological parameter sensor or a biological signal detector may be placed nearby a user terminal. In another example, a wearable sensor may be worn by a user so as to sense the physiological parameters generated by the user.

After the physiological parameters generated by the user are sensed, a difference between the user's pre-acquired reference emotion data and the user's currently sensed physiological parameters may be calculated and it may then be determined if the physiological parameters are within a normal range. Those physiological parameters within the normal range may then be treated as emotion data.

For example, if a user were to wear a sensor capable of sensing physiological parameters and such as heart rate and blood pressure while that user is chatting with a friend through a network, the emotion generated by the user may be, for example, determined as "joy." It is possible, therefore, to obtain the user's emotion data (82, 120, 90, 5) by the sensor worn by the user wherein the elements correspond to the user's heart rate, systolic pressure, diastolic pressure, and breath rate, respectively. These physiological parameters may then be received (block 101) as emotion data.

In another example, the emotion data may be received via a user inputting physiological parameters from an emotion data input interface. This example will be described below in connection with reference to FIG. 2.

Additionally, the emotion script may be generated (block 102) using the emotion data based on a predefined template. In the present specification, the predefined template may be a general-purpose template or a customized template, whose configurations may comprise emotion categories, emotion data acquisition manners, and user physiological parameters, among others. By using emotion data to embody the configurations of the predefined template, it is possible to obtain various emotion scripts and information related to various emotions of a user may be described. The predefined template may be formulated based on an Emotion Markup Language.

In one example, emotion categories may consist of the eight emotion types including joy, sadness, trust, disgust, fear, anger, surprise, and anticipation, or may be other predefined emotion-related types.

While generating (block 102) emotion script using the emotion data based on a predefined template, configurations of the predefined template may be determined and the emotion data may be added to the predefined template according to the configurations. Specifically, when a user learns of a serious accident when chatting with a friend, at this point the user's emotion may be "fear." The user's emotion data may be sensed by a sensor being worn by the user and the emotion data may be represented as (80, 100, 70). These elements may, for example, correspond to the user's heart rate, systolic pressure, and diastolic pressure respectively.

The configurations of the predefined template may then be determined. If, in this example, configurations of the predefined template comprise emotion categories, emotion data acquisition manners, and user physiological parameters, the emotion category in the predefined template may be recorded as, for example, "fear." Additionally, the emotion data acquisition manner may be recorded as, for example, "sensed by a sensor." Further, the heart rate may be recorded as "80," the systolic pressure may be recorded as "100," and the diastolic pressure may be recorded as "70." In this way, emotion script for the emotion "fear" may be generated according to the predefined template. Likewise, emotion script for other emotion types may be similarly generated according to the predefined template.

In one example, by using the emotion script generating method of the present specification the emotion script may be adjusted. In one example, the emotion script may be adjusted according to the predefined template. For example, each attribute of emotion script is obtained according to configurations of the predefined template and then these attributes may be changed as desired.

In another example, after emotion script is generated (block 102), the emotion script can be provided to the user so that the user can experience an emotion corresponding to the emotion script and adjust the emotion script as desired. Afterwards, the emotion script that was adjusted by the user may be received by the user or another user. In case of dissatisfaction, the user may further adjust and experience the emotion script until he or she obtains a desired emotion to be experienced by other users. In this way, when other users are provided with the emotion script, they may experience the emotion which the user wants them to experience.

Alternatively, by using the emotion script generating method of the present specification it is further possible to provide the emotion script to another user so that he or she may experience an emotion corresponding to the provided emotion script. The user can be affect or influenced in various manners so that the user may experience the emotion script. For example, the emotion script may be converted into audio signals which are then played by a notebook computer, a mobile phone, or a PDA so that the user experiences the emotion script by listening to the music. In another example, the emotion script may be provided to a lighting control system which converts the emotion script into optical signals so as to enable the user to experience the emotion script through changes of lighting around the user. In yet another example, a mouse may be provided with a weak current stimulus means which converts the emotion script into weak current signals thereby enabling the user to experience the emotion script through weak current signal stimulus sent by the mouse when the user's hand grips the mouse.

FIG. 2 is a flowchart of an emotion script generating method according to another example of the principles described herein. The method may begin with receiving (block 201) the user physiological parameter input from an emotion data input interface.

In the emotion script generating method of the present specification, the emotion data may be received in various manners. In one example, it is possible to receive user physiological parameters acquired by a physiological parameter sensor or a biological signal detector. For purpose in simplicity of illustration, however, the present method will be described in term of receiving (block 201) user physiological parameters input from an emotion data input interface.

Different types of emotion data input interfaces may be provided to the user. In one example, a text box may be provided in order to receive from the user values of physiological parameters, such as heart rate, diastolic pressure, systolic pressure and breath rate as input. In another example, a slide block may be provided such that a user can determine values of physiological parameters by dragging the slide block. In yet another example, a dropdown input box may be provided such that the user can select values of physiological parameters from a dropdown box.

The user may define a value for each physiological parameter as desired. In this example, if the user physiological parameters received from the emotion data input interface are (75, 110, 80, 10) then the elements respectively correspond to the user's physiological parameters such as heart rate, diastolic pressure, systolic pressure, and breath rate, among others.

After the user physiological parameter input is received (block 201) from, an emotion data input interface, configurations of the predefined template may be determined (block 202). In the present specification, the predefined template may be a general-purpose template or a customized template, whose configurations may comprise emotion categories, emotion data acquisition manners, and user physiological parameters, among others. By using emotion data to embody the configurations of the predefined template, it is possible to obtain various emotion scripts thereby scripting information related to emotions of a user.

In this example, it may be determined (block 202) that configurations of the predefined template comprises emotion categories, emotion data acquisition manners, heart rate, systolic pressure, diastolic pressure, and breath rate, among others. An example of the predefined template is shown below in which content inside double quotation marks can be changed. For example, the content may be updated using values of emotion data, so that different emotion script is obtained.

```
<emotemplate>
<emotion>
    <category set="basicEmotions" name="joy" /> <!-category indicates an emotion category-->
    <dimensions set="valenceArousal"><!-dimensions indicates that an emotion may be scripted from several dimensions, dimensions set= "valenceArousal" indicates that an emotion is scripted from psychological valence and arousal-->
        <arousal value="0.35" />
        <valence value="0.85' />
    </dimensions>
    <intensity value"0.8" /></!-intensity value represents intensity of an emotion-->
    <modality set="basicModalities" mode="face voice body" medium="physio" />
                <!-modality indicates acquisition manner of emotion data ->
    <metadata>
        <physio:bvpSystolic value="82" />
        <physio:bvpDiaStolic value="125" />
        <physio:heartRate value="90" />
    </metadata>          <!-metadata indicates user physiological parameters->
</emotion>
</emotemplate>
```

In one example, each configuration of the predefined template may have a default value. The default value may be selected from common values or preset values of the configuration at which point the predefined template is emotion script in itself. In another example, each configuration of the predefined template may have no value, i.e., set to "NULL" and, when emotion data is received, the respective configurations are filled with received parameters.

The emotion data may then be added (block 203) to the predefined template according to configurations of the predefined template. Because the user's physiological parameters received (block 201) from the emotion data input interface are set at (75, 110, 80, 10) and configurations of the predefined template as determined (block 202) comprise emotion categories, emotion data acquisition manners, heart rate, systolic pressure, diastolic pressure, and breath rate, among others, the user's physiological parameters may be populated into a corresponding location of the predefined one by one, according to configurations of the predefined template.

Below is shown an example of emotion script whose emotion category is "joy," in which the emotion data acquisition manner is that a sensor senses physiological parameters in which, for example, the heart rate is 75 beats per minute, the systolic pressure is 110 mmHg the diastolic pressure is 85 mmHg, and the breath rate is 10 breathes/minute.

```
<emotion>
    <category set="basicEmotions" name= "joy" />
        <!-category indicates an emotion category, "basicEmotions" is the set of eight
emotion types proposed by Robert Plutchik,
            name= "joy" indicates that the current emotion category is "joy"-->
<modality set="basicModalities" mode="face voice body" medium=" visual acoustic
physio" />
            <!-modality indicates where emotion data are obtained, basicModalities
indicates a basic manner for emotion data acquisition
            mode= "face voice body" indicates that emotion data are obtained from the face,
voice, and body ,
            medium= " visual acoustic physio " indicates that the medium acquiring emotion
data is a visual or acoustic sensor-->
    <intensity value="0.8" />
            <!-indicates that the intensity of joy is 0.8, which ranges between 0 and 1.0 and
which can be obtained using an emotion classification method -->
        <metadata>
            <!-meatadata indicates metadata, which comprise various physiological
parameters>
        <physio:bvpSystolic value="110" />
            <!-the systolic pressure is 125 mmHg -->
        <physio:bvpDiaStolic value="80" />
            <!-the diastolic pressure is 90 mmHg -->
        <physio:heartRate value="75" />
            <!-the heart rate is 82 beats/minute-->
    <physio:breathRate value="10" />
            <!-the breath rate is 10 breathes/minute -->
    </metadata>
</emotion>
```

Below is shown another example of an emotion script whose emotion category is "anger." In this example, user physiological parameters are (90, 130, 92, 15), wherein the emotion data was acquired using an emotion data input interface that acquires physiological parameters. In this example, the heart rate is 90 beats per minute, the systolic pressure is 130 mmHg the diastolic pressure is 92 mmHg, and the breath rate is 15 breathes/minute.

```
<emotion>
    <category set="basicEmotions" name="anger" />
    <modality set="basicModalities" mode="face voice body"
medium=" visual acoustic physio" />
        <intensity value="0.8" />
        <metadata>
            <physio:bvpSystolic value="130" />
            <physio:bvpDiaStolic value="90"/>
            <physio:heartRate value="92" />
            <physio:breathRate value="15" />
        </metadata>
</emotion>
```

Figure 3:
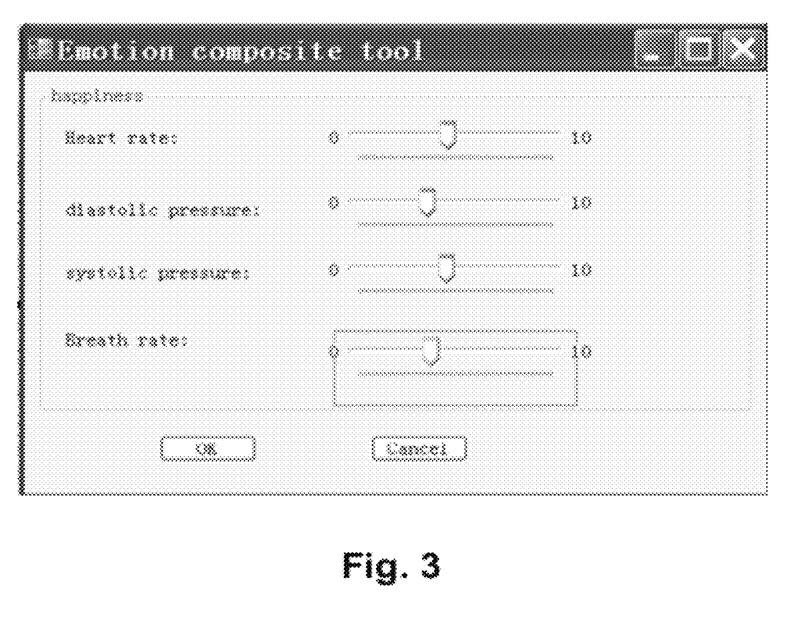
FIG. 3 is a schematic view of adjusting emotion data according to one example of principles described herein.

After the emotion data is added (block 203) to the predefined template according to the configurations of the predefined template, the emotion script may be provided (block 204) to the user. The emotion script may be provided (block 204) to the user via an emotion data adjustment interface according to an example of the present specification and as illustrated in FIG. 3. Specifically, an example of the emotion category "joy" is shown in the interface of FIG. 3 wherein the emotion data may comprise a heart rate, a diastolic pressure, a systolic pressure, and a breath rate. During display, values of a heart rate, a diastolic pressure, a systolic pressure, and a breath rate are normalized in order to facilitate use by the user. Although the physiological parameters such as heart rate, diastolic pressure, systolic pressure, and breath rate as shown in the emotion data input interface in FIG. 3 range between 0 and 10, those skilled in the art would readily appreciate that other proper ranges of values may be used as ranges for describing various physiological parameters. The emotion script may be provided (block 204) to the using other methods. For example, a text box other than the slide block in FIG. 3 may be provided in order to display values of physiological parameters such as heart rate, diastolic pressure, systolic pressure, and breath rate.

Once the emotion script is provided (block 204) to the user, the emotion script as adjusted by the user is received (block 205). The user may adjust these physiological parameters by using a mouse to drag the slide blocks of heart rate, diastolic pressure, systolic pressure, and breath rate as shown in FIG. 3, thereby obtaining the updated emotion data.

If, when the emotion script is provided (block 204) to the user, a text box is provided to display values of physiological parameters such as heart rate, diastolic pressure, systolic pressure, and breath rate, then the latest values inputted by the user into the text box are provided (block 204) to the user to adjust these physiological parameters, so the updated emotion data is obtained. Afterwards, the original emotion data in the data script may be replaced with the updated emotion data according to the predefined template, and thus the emotion script adjusted by the user may be obtained.

In one example, the procedures of adjusting the emotion script as described in connection with blocks 204 and 205 may be completed. However, in another example, if the emotion script is not to be adjusted, the generated emotion script can be directly used as the emotion script generated by the emotion script generating method of the present specification.

Once the emotion script adjusted by the user is received (block 205), the emotion script may be provided (block 206) to another user so that he or she can experience an emotion corresponding to the emotion script. The other user may be affected or influenced in various manners so as to experience the emotion script. For example, the emotion script may be converted into audio signals which are then played by a notebook computer, a mobile phone or a PDA so that the user experiences the emotion script by listening to the music. In another example, the emotion script may be provided to a lighting control system which may convert the emotion script into optical signals so as to enable the user to experience the emotion script through changes of lighting around the user. In yet another example, a mouse may be provided with a weak current stimulus means which converts the emotion script into weak current signals thereby enabling the user to experience the emotion script through weak current signal stimulus sent by the mouse when the user's hand grips the mouse.

In one example, the emotion script is not provided (block 206) to other users. If, however, as shown in FIG. 2 the emotion script is provided to other users, the emotion script generated when the emotion data is added (block 203) to the predefined template or the adjusted (block 204, 205) emotion data is directly used as the emotion script generated by the emotion script generating method of the present specification.

FIG. 4 is a block diagram of an emotion script generating apparatus according to an example of principles described herein. An emotion script generating apparatus (400) may comprise means (410) to receive emotion data, wherein the emotion data is obtained according to measurable physiological parameters reflective of a user's emotions. The emotion script generating apparatus (400) may further comprise means (420) to generate emotion script using the emotion data based on a predefined template.

In one example, the means (410) to receive emotion data may comprise means to receive user physiological parameters acquired by a physiological parameter sensor or a biological signal detector. In one example, the means to receive user physiological parameters may comprise a physiological parameter sensor or a biological signal detector. In another example, the means (410) to receive emotion data may comprise means to receive user physiological parameters input from an emotion data input interface.

In one example, the means (420) to generate emotion script using the emotion data based on a predefined template may comprise means to determine configurations of the predefined template and means to add the emotion data to the predefined template according to the configurations of the predefined template as described above in connection with FIG. 1.

In one example, the apparatus (400) may also comprise means (430) to adjust the emotion script according to the predefined template. In another example, the apparatus (400) may also comprise means (430) to adjust the emotion script, which comprises means to provide the emotion script to the user so that the user can experience an emotion corresponding to the emotion script and adjust the emotion script as needed and means to receive the emotion script adjusted by the user. In one example, the apparatus (400) may comprise means (440) to provide the emotion script to other users so that other users can experience an emotion corresponding to the emotion script.

In the present specification, configurations of the predefined template may comprise emotion categories, emotion data acquisition manners, and user physiological parameters, among others. The predefined template may be formulated based on an Emotion Markup Language (EML). Additionally, in the present specification, user physiological parameters may comprise a heart rate, a breath rate, a blood pressure, electroencephalogram parameters, a body temperature, and a cutaneogalvanic reaction, among others.

FIG. 5 is a flowchart of an emotion script experiencing method according to one example of principles described herein. The method may begin when the emotion script is received (block 501). The emotion script may be generated using emotion data based on a predefined template and the emotion data can be obtained according to measurable physiological parameters reflective of a user's emotions.

The emotion script to be received (block 501) may be received using an emotion script generating method similar to that illustrated in FIG. 1. The emotion script received (block 501) may come from, for example, the emotion script generating apparatus similar to that illustrated in FIG. 4.

After the emotion script has been received (block 501), a user is influenced or otherwise affected through the use of the emotion data extracted from the emotion script so that he or she can experience the emotion script. The user can be affected or influenced in various manners to experience the emotion script. For example, the emotion script may be converted into audio signals which are then played by a notebook computer, a mobile phone or a PDA so that the user experiences the emotion script by listening to the music. In another example, the emotion script may be provided to a lighting control system which converts the emotion script into optical signals so as to enable the user to experience the emotion script through changes of lighting around the user. In yet another example, a mouse may be provided with a weak current stimulus means which converts the emotion script into weak current signals thereby enabling the user to experience the emotion script through weak current signal stimulus sent by the mouse when the user's hand grips the mouse.

FIG. 6 is a block diagram of an emotion script experiencing apparatus according to one example of principles described herein. An emotion script experiencing apparatus (600) may comprise means (610) to receive an emotion script and means (620) to affect or influence the user. The means (610) to receive an emotion script receives emotion script wherein the emotion script is generated using emotion data and may based on a predefined template. The emotion data is capable of being obtained according to measurable physiological parameters reflective of a user's emotions. The means (620) to affect or influence the user may affect the user using emotion data extracted from the emotion script so that the user can experience the emotion script. As described above, the actuating means may comprise audio signals which are then played by a notebook computer, a mobile phone or a PDA to a user so that the user may experience the emotion script by listening to the music. In another example, the actuating means may be a lighting control system which converts the emotion script into optical signals so as to enable the user to experience the emotion script through changes of lighting around the user. In yet another example, the actuating means may comprise a mouse that is provided with a weak current stimulus device which converts the emotion script into weak current signals thereby enabling the user to experience the emotion script through weak current signal stimulus sent by the mouse when the user's hand grips the mouse.

FIG. 7 is a schematic view of an emotion interaction system (700) according to one example of principles described herein. The emotion interaction system (700) may comprise an emotion script generating apparatus (710) according to the present specification and an emotion script experiencing apparatus (720) for causing other users to experience emotion script from the emotion script generating apparatus (710).

In one example, the emotion script generating apparatus (710) may be implemented as the apparatus (400) as shown and described in FIG. 4 or other specific types of an emotion script generating apparatus according to the present specification. In another example, the emotion script experiencing apparatus (720) may be implemented as the apparatus (600) as shown and described in FIG. 6 or other specific types of an emotion script experiencing apparatus according to the present specification.

In the emotion interaction system (700), the emotion script generating apparatus (710) receives emotion data from a user (user 1) and generates emotion script using the received emotion script based on a predefined template. Then, the emotion script is transmitted to the emotion script experiencing apparatus (720) through a network or other medium. The emotion script experiencing apparatus (720) may cause a user (user 2) to be affected or influenced in various manners so as to cause the user (user 2) to experience the emotion script. For example, the emotion script may be converted into audio signals which are then played by a notebook computer, a mobile phone or a PDA so that the user (user 2) may experience the emotion script by listening to the music. In another example, the emotion script may be provided to a lighting control system which converts the emotion script into optical signals so as to enable the user (user 2) to experience the emotion script through changes of lighting around the user (user 2). In yet another example, a mouse may be provided with a weak current stimulus means which converts the emotion script into weak current signals thereby enabling the user (user 2) to experience the emotion script through weak current signal stimulus sent by the mouse when a hand of the user (user 2) grips the mouse. With the emotion interaction system (700) of the present specification, different users can exchange feelings between them by using emotion script so that user experience is improved significantly.

Figure 8:
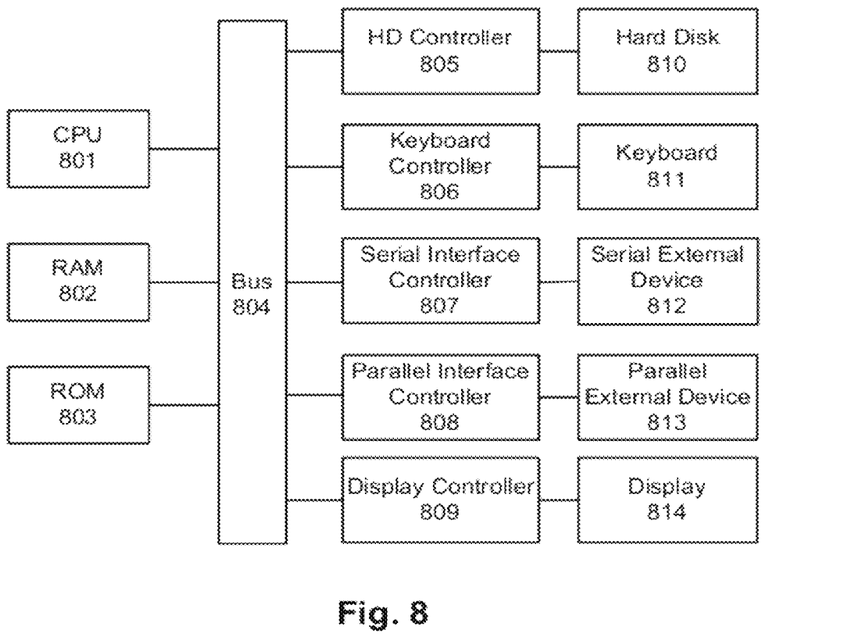
FIG. 8 is a structural block diagram of a computer system for implementing the emotion script generating method according to one example of principles described herein.

FIG. 8 is a structural block diagram of a computer system for implementing the emotion script generating method according to one example of principles described herein. A computer system for implementing the emotion script generating method may comprise a central processing unit (CPU) (801), random access memory (RAM) (802), read only memory (ROM) (803), a system bus (804), a hard disk controller (805), a keyboard controller (806), a serial interface controller (807), a parallel interface controller (808), a display controller (809), a hard disk (810), a keyboard (811), a serial external device (812), a parallel external device (813) and a display (814). Among these components, the CPU (801), the RAM (802), the ROM (803), the hard disk controller (805), the keyboard controller (806), the serial interface controller (807), the parallel interface controller (808) and the display controller (809) may be connected to the system bus (804). Additionally, the hard disk (810) may be connected to the hard disk controller (805), the keyboard (811) may be connected to the keyboard controller (806), the serial external device (812) may be connected to the serial interface controller (807), the parallel external device (813) may be connected to the serial interface controller (808), and the display (814) may be connected to the display controller (809).

In different examples, some components of the system described in FIG. 8 may be added to the structure shown in FIG. 8. In other examples some components shown in FIG. 8 may be omitted. The whole system shown in FIG. 8 may be controlled by computer readable instructions stored in the hard disk (810), in EPROM or other nonvolatile memories as software. The software can be downloaded from a network such as a local network, an intranet, or the internet. The software stored in the hard disk (810) or downloaded from the network can be uploaded to RAM (802) and executed by the CPU (801) to perform functions determined by the software.

Although the computer system as described in FIG. 8 can support the emotion script generating apparatus and the emotion script experiencing apparatus according to the present specification, it is merely one example of a computer system. Those skilled in the art would readily appreciate that many other computer system designs can also be used to realize those examples of the present specification.

The present specification further relates to a computer program product which includes a computer readable storage medium having computer useable program code for receiving emotion data, wherein the emotion data is obtained according to measurable physiological parameters reflective of a user's emotions, and generating emotion script using the emotion data based on a predefined template. Before use, the program code can be stored in memories of other computer systems, for example, stored in a hard disk or a removable memory such as a CD or a floppy disk, or downloaded via the Internet or other computer networks.

The methods as disclosed in the present specification can be implemented via hardware or combination of software and hardware. The hardware portion can be implemented by using dedicated logic and the software portion can be stored on a memory device and executed by an appropriate instruction executing system such as a microprocessor, a personal computer (PC) or a mainframe computer.

The present specification has been presented for purposes of illustration and description, and is not intended to be exhaustive or limited to the emotion script generating, experiencing, and interaction system and method in the form disclosed. Many modifications and variations will be apparent to those of ordinary skill in the art. Therefore, the examples were chosen and described in order to best explain the principles of the present system and method and its practical application, and to enable others of ordinary skill in the art to understand that all modifications and alterations made without departing from the spirit of the present specification fall into the protection scope of the present system and method as defined in the appended claims.

What is claimed is:

1. An emotion script generating apparatus, comprising:
   a sensor to receive a user's emotion data;
   a processor to generate emotion script using the emotion data based on a predefined template; the emotion script being computer readable program code, wherein the processor generates emotion script by:
   determining configurations of the predefined template, the configurations comprising a number of categories, one of the number of categories being a category of an emotion; and
   adding the values describing the emotion data into the number of categories of the predefined template according to the configurations of the predefined template;
   wherein the processor adjusts the generated emotion script according to the predefined template—by:
   providing the generated emotion script to an emotion data adjustment interface and providing the emotion data adjustment interface to the user;
   providing an emotion script experiencing apparatus to the user to experience an emotion corresponding to the emotion script by providing the generated emotion script to a number of devices that affect the user's environment;
   receiving the emotion script adjusted by the user after the user has experienced the emotion corresponding to the emotion script;
   wherein the processor replaces the stored emotion script with the adjusted emotion script; and
   wherein the processor associates the adjusted emotion script with a specific emotion felt by the user.

2. The apparatus of claim 1, in which the emotion data is obtained according to measurable physiological parameters reflective of the user's emotions.

3. The apparatus of claim 1, wherein the sensor comprises: physiological parameter sensor or a biological signal detector.

4. The apparatus of claim 1, wherein the sensor comprises receiving the user's physiological parameters that are input from an emotion data input interface.

5. The apparatus of claim 1, in which configurations of the predefined template comprise: emotion categories, emotion data acquisition manners, and user physiological parameters.

6. The apparatus of claim 1, wherein the emotion script generating apparatus transfers the emotion script to other emotion script experiencing apparatus associated with other users so that the other users experience an emotion corresponding to the emotion script.

7. The apparatus of claim 1, in which the predefined template is based on an Emotion Markup Language.

8. The apparatus of claim 1, wherein the processor compares the received emotion data to a previously acquired user reference emotion data.

9. The apparatus of claim 1, wherein the category of emotion comprises joy, sadness, trust, disgust, fear, anger, surprise, and anticipation.

10. The apparatus of claim 1, wherein the categories of emotion comprise sub-categories.

11. An emotion script experiencing apparatus, comprising:
means to receive emotion script, wherein the emotion script is generated using emotion script generation means, wherein the emotion script generation means comprises:
    means to obtain emotion data according to measurable physiological parameters reflective of a first user's emotions;
    means to determine configurations of a customized template, the configurations comprising a number of categories, on the of number of categories comprising a category of an emotion; and
    means to add the emotion data to the customized template according to the configurations of the customized template; and
means to affect a second user by using the emotion data extracted from the emotion script, so as to cause the second user to experience the emotion script;
in which the emotion script is computer readable program code generated by placing values of the emotion data into categories within the customized template; and
in which the emotion script is adjusted by the first user, previous to affecting the second user, by:
    providing the generated emotion script to a number of devices that affect the first user's environment so that the first user can experience an emotion;
    receiving adjustments to the generated emotion script at an emotion data adjustment interface by the first user;
    replacing the generated emotion script with the adjusted emotion script; and
    associating the adjusted emotion script with a specific emotion felt by the first user.

12. The emotion script experiencing apparatus of claim 11, wherein the emotion script generation means comprises:
means to compare the emotion data to a threshold range of values indicating a normal range of an emotion.

13. The emotion script experiencing apparatus of claim 12, wherein, if the emotion data is within the threshold range of values indicating a normal range of an emotion, the received emotion data is used by the means to generate emotion script.

14. An emotion interaction system, comprising:
an emotion script generating apparatus, comprising:
    a sensor to receive a first user's emotion data;
    a processor to generate emotion script using the emotion data based on a predefined template, wherein the processor:
        determines configurations of the predefined template, the configurations comprising a category of an emotion; and
        adds the emotion data to the predefined template according to the configurations of the predefined template; and
    wherein the processor adjusts the generated emotion script according to the predefined template—by:
        providing the generated emotion script to the first user so that the first user experiences an emotion corresponding to the generated emotion script and adjusting the emotion script, the emotion script generating apparatus comprising an emotion data adjustment interface and a first number of devices that affect the first user's environment; and
        receiving the emotion script adjusted by the first user;
        wherein the generated emotion script is replaced by the adjusted emotion script with the adjusted emotion script being associated with an emotion felt by the first user; and
an emotion script experiencing apparatus to:
    receive the emotion script, wherein the emotion script is generated using the emotion data and is based on the predefined template, the emotion data capable of being obtained according to measurable physiological parameters reflective of the emotion felt by the first user; and
    provide the emotion script to a second number of devices to affect a second user by using the emotion data extracted from the emotion script, so as to cause the second user to experience the emotion script;
wherein the emotion script is computer readable program code generated by placing values of the emotion data into categories within the predefined template.

15. The apparatus of claim 1, wherein the processor compares the received emotion data to a threshold range of values indicating a normal range of an emotion.

16. The apparatus of claim 15, wherein the normal range of emotion is determined based on medical criteria.

17. The apparatus of claim 15, wherein, if the emotion data received is within the threshold range of values indicating a normal range of an emotion, the received emotion data is used by the means to generate emotion script.

18. The apparatus of claim 15, wherein, if the emotion data received is not within the threshold range of values indicating a normal range of an emotion, the received emotion data is not used by the means to generate emotion script.

19. The emotion interaction system of claim 14, wherein the emotion script generating apparatus comprises compares the emotion data to a threshold range of values indicating a normal range of an emotion.

20. The emotion interaction system of claim 19, wherein, if the emotion data is within the threshold range of values indicating a normal range of an emotion, the received emotion data is used by the means to generate emotion script.

* * * * *